United States Patent [19]
Derwin et al.

[11] Patent Number: 5,341,487
[45] Date of Patent: Aug. 23, 1994

[54] PERSONAL COMPUTER HAVING MEMORY SYSTEM WITH WRITE-THROUGH CACHE AND PIPELINED SNOOP CYCLES

[75] Inventors: Michael T. Derwin, Delray Beach; William A. Wall, Boca Raton, both of Fla.

[73] Assignee: International Business Machines Corp., Armonk, N.Y.

[21] Appl. No.: 812,196

[22] Filed: Dec. 20, 1991

[51] Int. Cl.$^5$ .............. G06F 12/00; G06F 9/38
[52] U.S. Cl. .................. 395/425; 395/375; 364/DIG. 1; 364/243.41; 364/271.6; 364/271.8; 364/263; 364/238.4; 364/948.34; 364/964.34
[58] Field of Search ............... 395/425, 375

[56] References Cited

U.S. PATENT DOCUMENTS

| | | | |
|---|---|---|---|
| 4,392,200 | 7/1983 | Arulpragasam et al. | 364/DIG. 1 |
| 4,638,431 | 1/1987 | Nishimura | 395/425 |
| 5,025,365 | 6/1991 | Mathur et al. | 364/DIG. 1 |
| 5,091,846 | 2/1992 | Sachs et al. | 395/250 |
| 5,119,485 | 6/1992 | Ledbetter, Jr. et al. | 395/425 |
| 5,193,170 | 3/1993 | Lam | 395/425 |

OTHER PUBLICATIONS

IBM Technical Disclosure Bulletin, vol. 34, No. 1, Jun. 1991, New York US pp. 254-256 "Fixed-length pepelined-bus-protocol for snoop cache".

*Primary Examiner*—Eddie P. Chan
*Attorney, Agent, or Firm*—Robert S. Babayi

[57] ABSTRACT

A personal computer has a memory system including a write-through cache which is accessible by more than one device. A snoop mechanism includes logic that monitors bus master control signals to determine if a new memory write cycle has been started before a current snoop cycle has finished. If a new cycle has been started, then a corresponding snoop cycle occurs which overlaps the new memory cycle and is pipelined with the previous snoop cycle so that the snooping mechanism does not fall behind the memory write cycles.

11 Claims, 3 Drawing Sheets

PERSONAL COMPUTER HAVING MEMORY SYSTEM WITH WRITE-THROUGH CACHE AND PIPELINED SNOOP CYCLES

FIELD OF THE INVENTION

This invention relates to the field of data processing, and, more particularly, to improvements in a personal computer having a memory system provided with a write-through cache and pipelined snoop cycles for invalidating lines in such cache.

BACKGROUND OF THE INVENTION

Memory systems are known which include a main memory and a high speed cache for temporarily storing data, the data in the cache being readily accessible by a processor or microprocessor. If a computer is designed so that more than one device has access to the cacheable memory, cache coherency must be maintained to keep the cache contents consistent with memory. Consider the following situation: a central processing unit (CPU) is using a write-through cache to temporarily store data from main memory while an alternate bus master also has access to the data in main memory. If the bus master writes new data into a memory location which also happens to reside in the CPU cache, then an invalidation cycle must occur to let the CPU know that the data in its cache is no longer valid. An invalidation cycle, also known as a "snoop" cycle, must occur simultaneously with the bus master write cycle. Such action will eliminate any latency between the time that new data is written into main memory and the time that the CPU knows that its cache location is invalid.

If a bus master performs several write cycles to main memory, each cache line affected must be invalidated in the cache. As long as the basic snoop cycle is shorter in duration than a memory write cycle, there is no problem in performing consecutive snoop cycles. However, if the length of the basic snoop cycle is longer than a memory write cycle, one of two situations might occur: 1) cache coherency (contents of cache being the same as corresponding contents of main memory) will not be maintained because the snoop control mechanism cannot keep up with the bus master write cycles, or 2) the bus master is forced to run slower cycles so that the snoop cycles can be completed. If the snoop cycles can be pipelined, then such situations can be avoided.

SUMMARY OF THE INVENTION

One of the objects of the invention is to provide an improved snoop control mechanism for a memory system having a write-through cache, which mechanism pipelines successive snoop cycles having a basic snoop cycle duration longer than the duration of a memory write cycle.

Another object of the invention is to provide a snoop control mechanism in which snoop cycles are pipelined to prevent cache incoherency.

A further object of the invention is to pipeline snoop cycles so as to allow a bus master to run at full speed to perform successive write cycles.

Still another object of the invention is to write to memory locations having corresponding cache locations located in different cache lines and invalidate such cache lines using snoop cycles that are pipelined and have a basic duration longer than that of a memory write cycle.

Briefly, in accordance with the invention, a memory system has a write-through cache which is accessible by more than one device. A snoop mechanism includes logic that monitors bus master control signals to determine if a new memory write cycle has been started before a current snoop cycle has finished. If a new cycle has been started, then a corresponding snoop cycle occurs which overlaps and is pipelined with the previous snoop cycle so that the snooping mechanism does not fall behind the memory write cycles.

DRAWINGS

Other objects and advantages of the invention will be apparent from the following description taken in connection with the accompanying drawings wherein.

DESCRIPTION

The following description first describes an exemplary data processing system which incorporates the invention, and then describes details of a snoop mechanism constructed in accordance with the invention.

DATA PROCESSING SYSTEM

Figure 1:
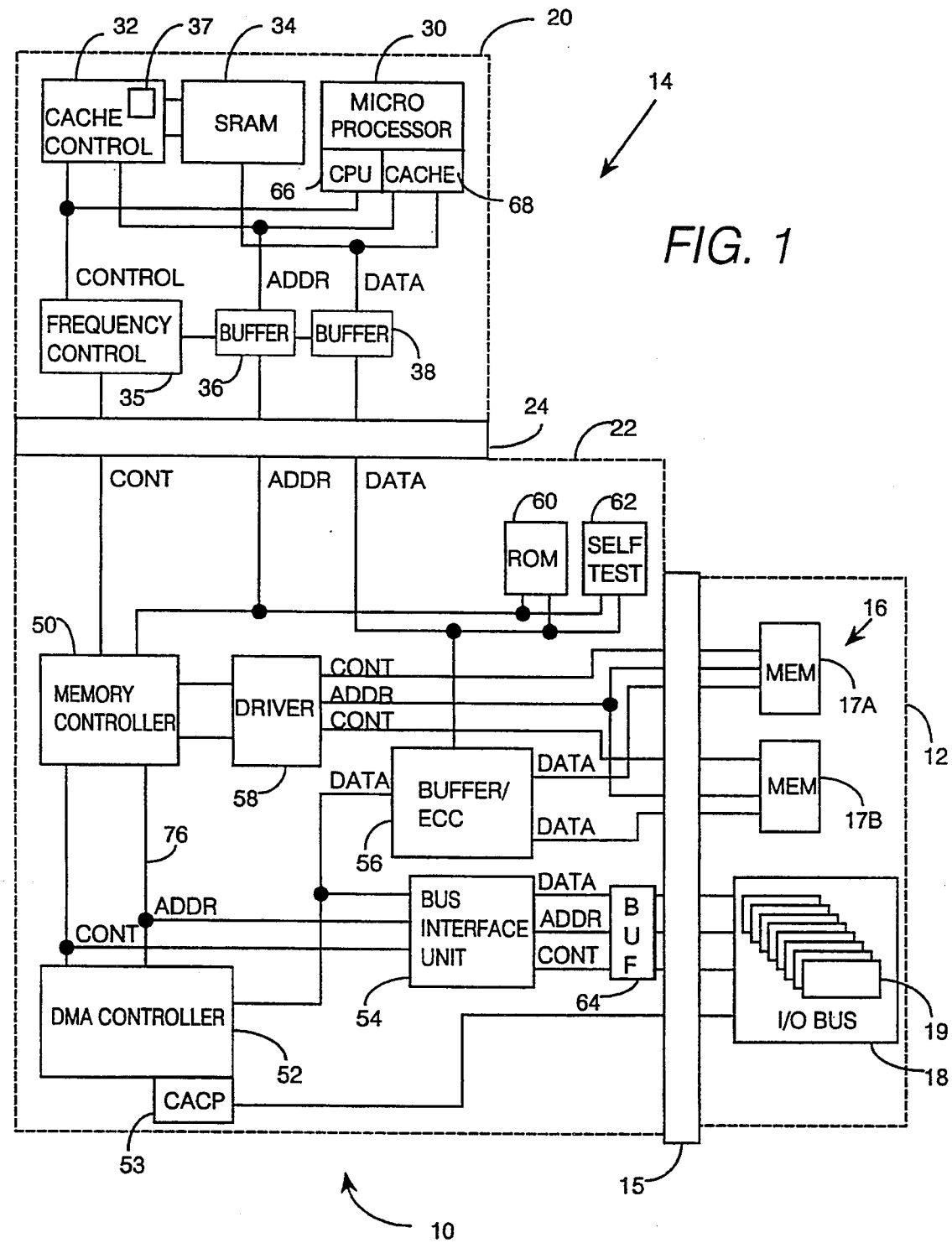
FIG. 1 is a block diagram of a personal computer embodying the invention.

Referring to FIG. 1, computer system 10 includes system board (i.e., planar) 12 as well as processor complex 14. Processor complex 14 is connected to planar 12 via processor complex connector 15. Planar 12 includes a planar memory 16 as well as input/output (I/O) bus 18, which may for example conform to the MICRO CHANNEL computer architecture. Memory 16 includes two banks 17A and 17B which forms a two-way interleaved memory. Expansion devices 19 may be connected to computer 10 via I/O bus 18. Planar 12 may also include conventional video circuitry, timing circuitry, keyboard control circuitry and interrupt circuitry (all not shown) which are used by computer 10 during normal operation.

Processor complex 14 includes processor portion 20 and base portion 22. Processor portion 20 is connected to base portion 22 via local bus connector 24. Processor portion 20 operates at 50 MHz and base portion 22 operates at 40 MHz.

Processor portion 20 includes microprocessor 30 (e.g., available from Intel, Inc. under the trade designation 486), cache control module 32, memory 34 (e.g., static random access memory (SRAM)), and frequency control module 35 as well as address buffer 36 and data buffer 38. A data information path is provided between microprocessor 30, memory 34 and data buffer 38. An address information path is provided between microprocessor 30, cache control circuit 32 and address buffer 36. A control information path is provided between microprocessor 30, cache control module 32 and frequency control module 35. Additionally, an address information path and a control information path are provided between cache control module 32 and memory 34. The data, address and control information paths represent a processor bus.

Memory 34 provides a second level cache function by storing in short term memory information from memory 16 or from memory which is located on an expansion device 19. Cache control module 32 includes tag random access memory (RAM) 37 which stores the address of memory 16 to which the information, which is stored in memory 34, corresponds.

Frequency control module 35 synchronizes the 50 MHz processor portion with the 40 MHz base portion; frequency control module 35 also controls buffers 36, 38. Accordingly, frequency control module 35 determines when information is captured by buffers 36, 38 and when information that is stored in buffers 36, 38 is overwritten. Buffers 36, 38 are configured to allow two writes from memory 16 to be stored in buffers 36, 38 simultaneously. Buffers 36, 38 are bidirectional, i.e., buffers 36, 38 can latch information which is provided by processor portion 20 and information which is provided to processor portion 20. Because buffers 36, 38 are bidirectional, processor portion 20 may be replaced or upgraded while maintaining a standard base portion 22.

Base portion 22 includes memory controller 50, direct memory access (DMA)controller (DMAC) 52, central arbitration control point (CACP) circuit 53, bus interface unit (BIU) 54 and buffer/error correction code (ECC) circuit 56. Base portion 22 also includes driver circuit 58, read only memory (ROM) 60, self test circuit 62 and buffer circuit 64. A control information path is provided between memory controller 50 and frequency control module 35 of processor portion 20. Control information paths are also provided between: memory controller 50, DMA controller 52 and bus interface unit 54; memory controller 50 and driver 58; driver 58 and memory 16; bus interface unit 54 and buffer 64; buffer 64 and I/O bus 18 of planar 12; and, CACP 53 and I/O bus 18 of planar 12. An address information path is provided between memory controller 50, ROM 60 and self test circuit 62 as well as address buffer 36 of processor portion 20. Address information paths are also provided between: memory controller 50, DMA controller 52 and bus interface unit 54; memory controller 50 and driver 58; driver 58 and memory 16; bus interface unit 54 and buffer 64; and, buffer 64 and I/O bus 18 of planar 12. A data information path is provided between buffer/ECC circuit 56, ROM 60, and self test circuit 62 as well as data buffer 38 of processor portion 20. Data information paths are also provided between: buffer/ECC circuit 56, DMA controller 52 and bus interface unit 54; buffer/ECC circuit 56 and memory 16; buffer/ECC circuit 56 and memory 17; bus interface unit 54 and buffer 64; and, buffer 64 and I/O bus 18 of planar 12. The information paths may also be referred to hereinafter as "busses".

Memory controller 50 analyzes address information which is received from processor portion 20 to determine if this information corresponds to an address of planar memory 16 or to an address of memory which is on an expansion device 19 (i.e., expansion memory). If the address information corresponds to an address of memory 16, then memory controller 50 initiates a planar memory cycle to memory 16. The address information from processor 30 comprises thirty two bits which are converted by memory controller into the appropriate row and column address bits for accessing memory 16. While the planar memory cycle is occurring, memory controller 50 allows either DMA controller 52, or a bus master expansion device 19 to access information via I/O bus 18.

If the address information corresponds to an expansion memory address, then memory controller 50 initiates an expansion memory cycle with the expansion memory. During an expansion memory cycle, the address which is provided to memory controller 50 is provided via bus interface unit 54 to I/O bus 18. The expansion device which includes the memory to which the address corresponds receives the memory address from I/O bus 18. If the data is being retrieved from the expansion memory, the data information which is stored in the expansion memory is provided to processor portion 20 via I/O bus 18, buffer circuit 64, bus interface unit 54, buffer/ECC circuit 56 and driver circuit 58. If the data is being written to the expansion memory, the data information is provided to the expansion memory via bus interface unit 54 and I/O bus 18. Also, DMA controller 52 controls interchanging information between memory 16 and memory which is on an expansion device 19.

DMA controller 52 provides three functions for processor complex 14. DMA controller 52 utilizes a small computer subsystem control block (SCB) architecture to configure DMA channels, thus avoiding the necessity of using programmed I/O to configure DMA channels. DMA controller 52 also provides a buffering function to optimize transfers between slow expansion devices and fast memory devices. DMA controller 52 also provides an eight channel, 32-bit data, address and byte transfer count direct memory access function. When providing the DMA function, DMA controller 52 may function in two modes. In a first mode, DMA controller 52 functions in a programmed I/O mode in which DMA controller 52 is functionally an I/0 slave. In a second mode, DMA controller 52 functions as a DMA bus master, in which DMA controller 52 arbitrates for and controls I/O bus 18. During this second mode, DMA controller 52 uses a first in, first out (FIFO) register circuit; data from a source is passed through the FIFO register circuit prior to being provided to a destination. Accordingly, a serial DMA operation is performed.

CACP 53 functions as the arbiter for computer system 10. CACP 53 receives arbitration control signals from DMA controller 52 as well as expansion devices 19 and controls, by providing arbitration control information, which device may transfer information via I/O bus 18 and for how long a particular device may control (i.e., own) I/O bus 18.

Bus interface unit 54 provides the bi-directional interface between the architecture of processor complex 14 and the architecture of I/O bus 18. Bus interface unit 54 also provides a buffering function to optimize the interface between the two architectures. Bus interface unit 54 also provides a bus sizing function. I.e., bus interface unit 54 can receive information in 32-bit wide segments and provide the information to I/O bus 18 in smaller segments depending on the requirements of the expansion device 19 with which processor complex 14 is communicating.

Buffer/ECC circuit 56 provides a data path between processor portion 20 and memory 16, a data path between memory 16 and DMA controller 52 and bus controller 54. Buffer/ECC circuit 56 also provides a data path between processor portion 20 and DMA controller 52 and bus interface circuit 54. Buffer/ECC circuit 56 checks for errors via error correction code;

additionally, buffer/ECC circuit 56 is capable of operating with and supporting parity memory for downward compatibility with planar 12 which include parity memory.

Driver circuit 58 provides control information and address information from memory controller 50 to memory 16. Driver circuit 58 drives this information based upon the number of SIMMs which are used in memory 16. I.e., driver circuit 58 varies the signal intensity of the control and address information which is provided to memory 16 based upon the size of memory 16. The size of memory 16 is determined by software during an initialization of computer 10.

Buffer circuit 64 provides isolation between base portion 22 and planar 12. Buffer circuit 64 uses buffers which allow buffer circuit 64 to capture boundary information between I/O bus 18 and bus interface unit 54 in real time; i.e., the buffers store the information as it appears at connector 15. Accordingly, if computer 10 experiences a failure condition, buffer circuit 64 may be accessed by a computer repair person to determine the information which was present at connector 15 upon failure of computer 10.

Self test circuit 62, which is connected to a plurality of locations within base portion 22, provides a plurality of self test features. Self test circuit 62 accesses buffer circuit 64 to determine if failure conditions exist. Self test circuit 62 also tests the other major components of base portion 22 upon power-on to determine whether computer 10 is ready for operation.

Microprocessor chip 30 has a CPU 66 and a first level write-through cache 68. Such cache has a plurality of storage location arranged in cache lines where each cache line holds sixteen bytes of information. When CPU accesses a location in main memory, that location along with adjacent locations are read into a line of caches 34 or 68. DMA controller 52 and BIU 54 act as bus masters and can access memory 16 directly. Should a bus master write to a location in memory 16, a check is also made to see if the contents of such location are also stored in either cache. If so, the cache line containing such location must be invalidated. Cache line invalidation is done by snoop cycles under the control of a snoop mechanism located in memory controller 50.

SNOOP MECHANISM

Figure 2:
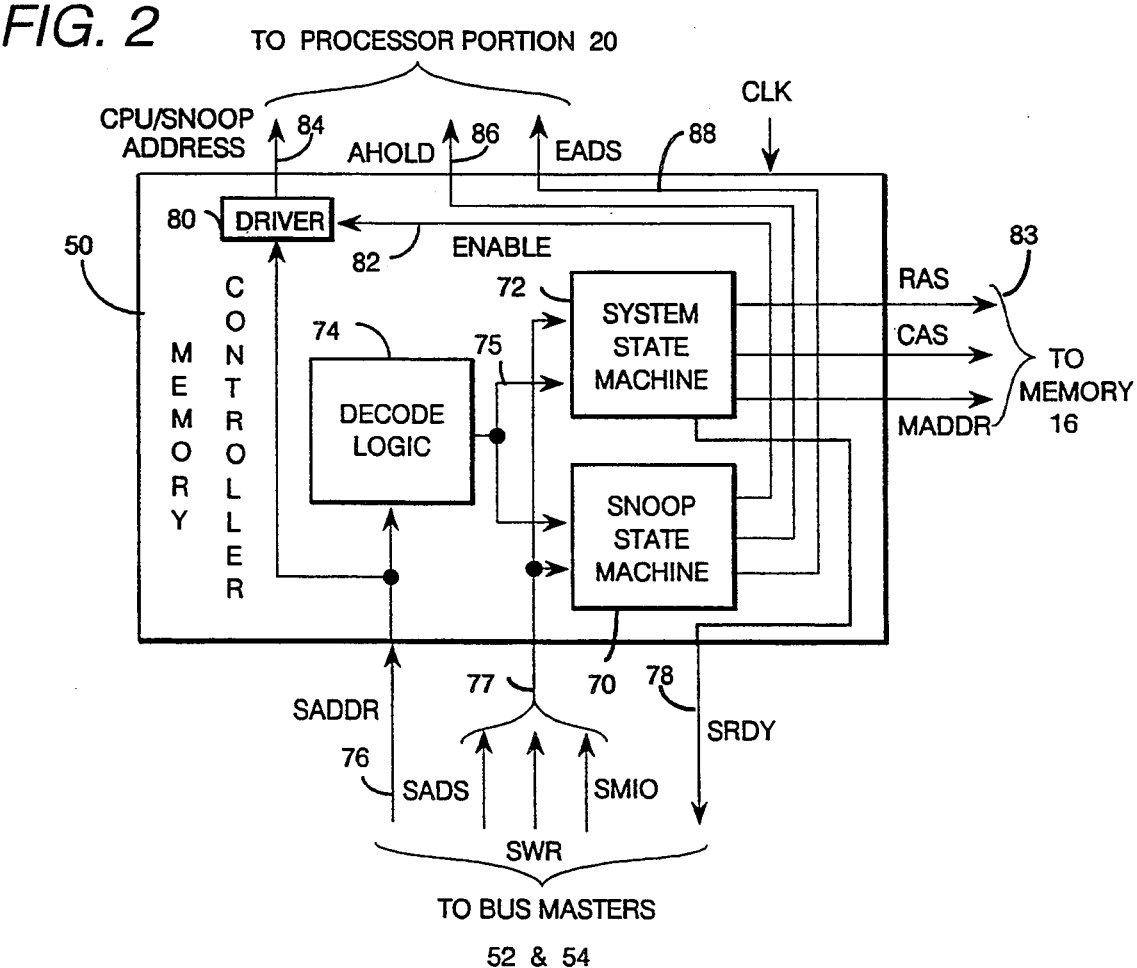
FIG. 2 is a more detailed block diagram of a portion shown in FIG. 1.

Referring to FIG. 2, controller 50 receives a plurality of input signals and produces a plurality of output signals, which signals are discussed in more detail hereinafter and control memory and snoop cycles. The operation of controller 50 is timed in accordance with a CLK signal received from a standard system clock or oscillator (not shown). Controller 50 generally comprises a snoop state machine (SM) 70, a system SM 72, decode logic 74, and an address driver 80. Snoop SM 70 controls snoop cycles and system SM 72 controls memory accesses including memory write cycles. Memory controller 50 is connected to DMAC 52 and to BIU 54 via address and control lines including an address bus 76 for receiving SADDR signals, control lines 77 for receiving SADS, SWR and SMIO signals, and control line 78 for sending a SRDY signal. Bus 76 is further connected to decode logic 74 and driver 80. Driver 80 is a bidirectional driver. Control lines 77 are further connected to both state machines 70 and 72, and control line 78 is connected to system SM 72. SM 72 is connected to memory through a planar memory bus 83 that includes lines for transmitting RAS, CAS, and MADDR signals from SM 72 to memory 16.

The general operation of system SM 72 is as follows. When a system address SADDR is received on bus 76, decode logic 74 determines if the address is a planar memory cacheable address, and if so, produces an output that is fed on bus 75 to both state machines. System SM 72 also receives the system address strobe, write/read, and memory IO signals SADS, SWR, and SMIO on lines 77. When the combination of such signals defines a memory write request to planar memory 16, state SM 72 transmits to memory 16 time multiplexed row and column addresses MADDR, and row and column address strobe signals RAS and CAS, to write to the addressed location. System SM 72 sends a SRDY signal to the bus master when data has been accepted, which signal may be used to gate the next data item to be stored. The SADS and SRDY signals define the beginning and end of a memory cycle.

Snoop SM 70 has inputs connected to lines 75 and 77. When a write request is made to cacheable memory, SM 70 determines if a snoop cycle is required. If a snoop cycle is required, snoop SM 70 then generates on lines 82, 86 and 88 ENABLE, AHOLD, and EADS signals. In response to receiving an active ENABLE signal, driver 80 gates a snoop address onto bus 84 which address goes to the caches in processor portion 20. The AHOLD and EADS signals control invalidating cycles in the caches. The AHOLD signal is sent to the microprocessor as a standard address hold request permitting access to the local processor bus for performing an invalidation. EADS is an external address valid input signal indicating a valid snoop address, and such signal causes a cache line invalidation to occur.

The memory controller external signals shown in FIG. 2 are standard and it is the timing thereof in accordance with the invention that produces pipelined snoop cycles. There are certain assumptions or conditions that the overall system must satisfy in order to utilize the invention. The system is a store-through memory/cache system which requires invalidation of bus master write cycles. The worst case conditions for snoop cycles to keep up with memory write cycles occur when memory writes occur back-to-back on consecutive cycles to different cache lines all having the same row address. A basic snoop cycle has a predetermined fixed length due to system timing and cache architecture. A memory write cycle is shorter than the basic snoop cycle. The basic snoop cycle can be shortened when operating in pipelined mode. In the exemplary embodiment, the memory write cycle requires four clock periods or simply "clocks", a basic snoop cycle requires seven clocks, and the basic snoop cycle can be shortened to four clocks in pipelined mode.

Figure 3:
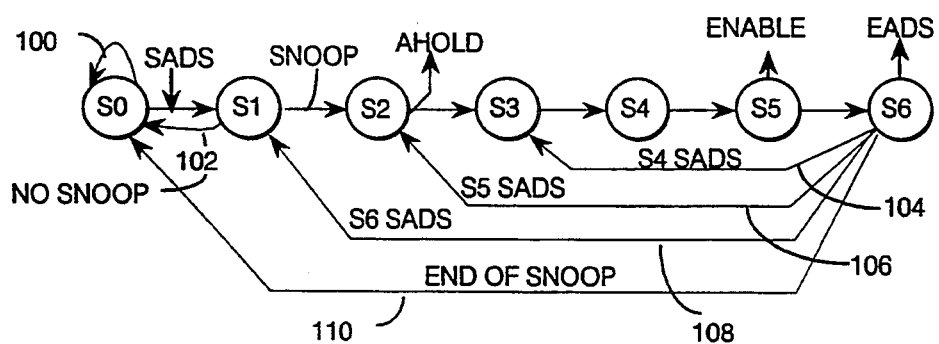
FIG. 3 is a diagram of a state machine shown in FIG. 2.

Referring to FIG. 3, snoop SM 70 has seven states respectively denoted S0-S6. State S0 is an idle state which remains in a loop denoted by path 100 until a negative going SADS signal is received from a bus master whereupon SM 70 switches to state S1. In state S1, the decode logic output becomes available, a determination is made if the current cycle is a memory write to cacheable planar memory and if it will require a corresponding invalidation or snoop cycle. It is possible that the address is to a cacheable planar memory location but that because a previous snoop cycle has already invalidated the corresponding cache line, a snoop cycle is not required. If no snoop cycle is required, a transition 102 switches SM 70 back to the idle state S0. If a snoop cycle is required, SM 70 switches to state S2 in which the AHOLD signal is driven high or activated. This action gains access to the local processor address bus and allows second level cache 34 to setup and prepare for receiving the snoop address. In the particular implementation, two clocks are required to accomplish such setup. Thus, following S2, two delay states S3 and S4 occur allowing the second level cache setup to be made.

State S5 generates the ENABLE signal causing driver 78 to place a snoop address onto bus 84. Then, address strobe EADS is driven in state S6 and this signal is received by the caches and causes the addressed cache line to be invalidated. State S4 also monitors or looks for an active SADS signal and makes note of such fact which note is made use of in state S6. If no active SADS signal is detected or noted in state S6, a snoop cycle ends and a transition 110 is made switching SM 70 back to state S0. If an active SADS signal is noted in S4, a transition 104 is made switching SM 70 back to state S3 to execute a pipelined snoop cycle having a duration of four clocks. Such transition eliminates or bypasses the first three clocks in a basic snoop cycle (BSC) for the following reasons. First, the first two clocks of a BSC are used to receive the SADDR signals and process them in decode logic 74 which is independent of the snoop SM. When the SADS signal becomes available in S4, decode logic 74 makes its determination during S5 and S6 and such determination thereupon becomes available to SM 70. Second, since the AHOLD signal is already driven high, state S2 can be eliminated.

The foregoing discussion of using transition 104 occurs using a fast memory that requires four clocks. If the memory is slower and requires five clocks, the SADS signal occurs in state S5 and a transition 106 returns from state S6 to S2. If the memory is still slower and requires six clocks, transition 108 is made from state S6 to state S1.

Figure 4:
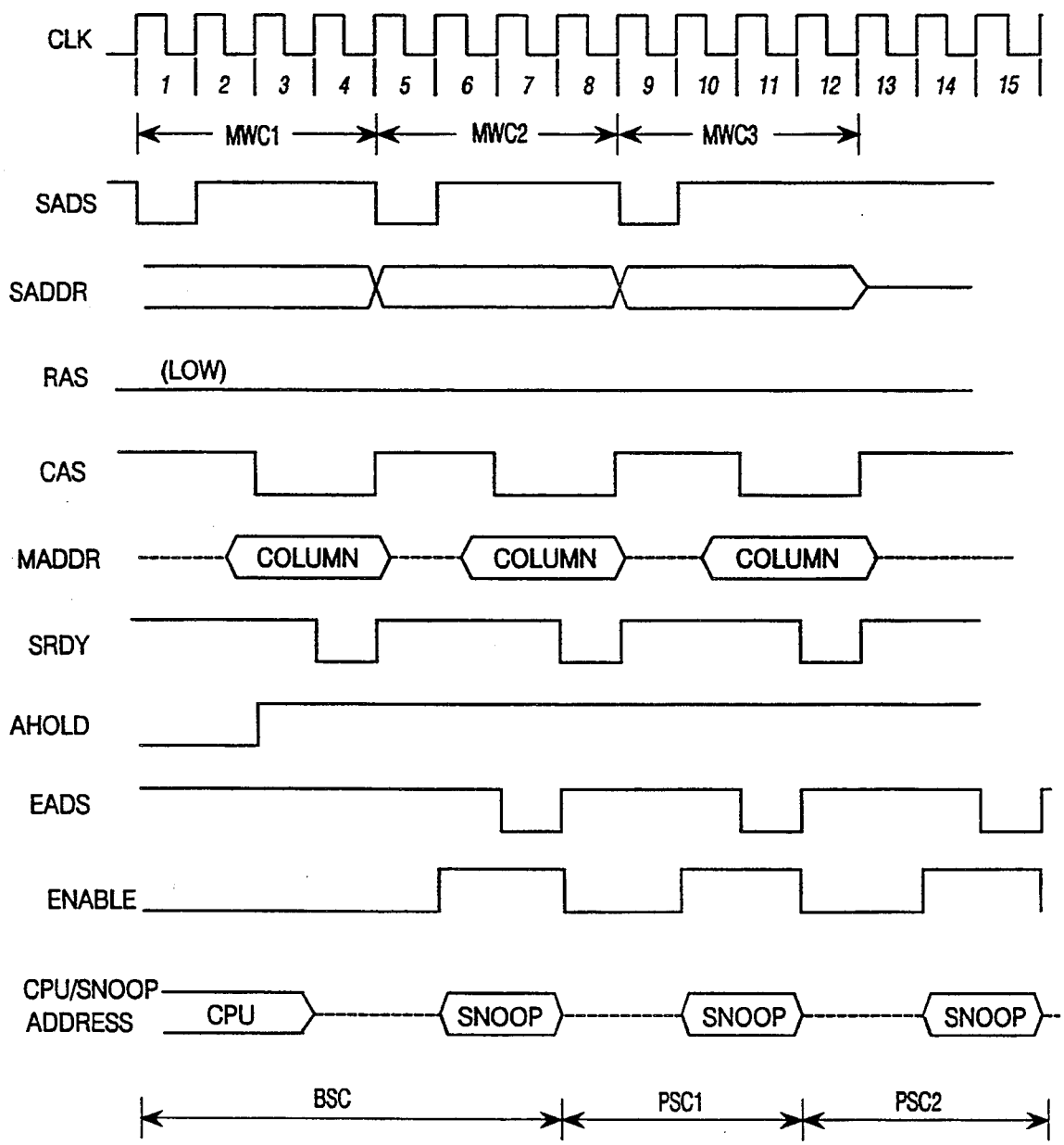
FIG. 4 is a timing diagram of waveforms illustrating pipelined snoop cycles produced by the state machine shown in FIG. 3.

Referring to FIG. 4, the clocks as defined by CLK signal are consecutively numbered on the top line, and three consecutive memory write cycles (MwC) MWC1–MwC3 are shown as occurring during clocks 1–12. Each MRC has a duration of four clocks. During each memory write cycle, the address SADDR of the location to be written to, along with an address strobe signal SADS, is sent to controller 50 and the SMs. System SM 72 then acts in normal fashion to generate planar memory address MADDR and the column and row strobes CAS and RAS for writing to the addressed locations. FIG. 4 illustrates operation at the highest performance in which the snoop cycles are able to keep up with consecutive memory write cycles under the aforementioned worst case conditions. At the end of each memory cycle, SM 72 sends the SRDY signal back to the bus master thereby allowing the bus master to write to a new location.

A basic snoop cycle (BSC) lasts seven clocks and the consecutive pipelined snoop cycles (PSC) each last four cycles. In the BSC, states S1-S3 occur in clocks 1-3 and AHOLD is switched in clock 3 to prepare the caches for line invalidation. Such preparation occurs during clocks 4 and 5. A SNOOP ADDRESS is driven onto bus 84 and thereby becomes valid in clock 6 and the BSC ends with the EADS signal being transmitted in clock 7. Since a SADS appeared in clock 5, when the snoop SM is in state S4, PSC1 then follows in clocks 8-11, and because of the SADS signal in clock 12, PSC2 occurs in clocks 12-15. Note should be made that the memory write cycles precede the pipeline snoop cycles and thus allow a snoop cycle to determine before it ends that another memory write cycle is occurring which requires a subsequent pipeline snoop cycle.

It should be apparent to those skilled in the art that many changes can be made in the details and arrangements of steps and parts without departing from the scope of the invention as defined in the appended claims.

What is claimed is:

1. A personal computer comprising:
   a memory system including a planar memory and a write-through cache, said cache comprising a cache memory for storing a plurality of cache lines and a cache controller for controlling access to said cache memory and selectively invalidating cache lines in said cache memory in response to receiving invalidating signals;
   bus master means for generating control signals and producing a plurality of consecutive memory write cycles during which a plurality of planar writes occur that require invalidation of different cache lines; and
   a memory controller connected to said memory system and said bus master means for controlling access to said planar memory, said memory controller comprising
   first snoop control means operative, during a first memory write cycle of said consecutive memory write cycles, to start a basic snoop cycle during which said first snoop control means transmits first invalidating signals to said cache control for invalidating a first cache line corresponding to a first planar memory location being written in during said first memory write cycle, said basic snoop cycle being longer than a memory write cycle,
   monitoring means connected to said bus master means for monitoring said control signals and detecting when a second memory write cycle has been started by said bus master before said basic snoop cycle has finished, and for generating a snoop control signal in response to detecting that said second memory write cycle has been started before said basic snoop cycle has finished, and
   second snoop control means connected to said monitoring means for receiving said snoop control signal and initiating, in response to said snoop control signal, a pipeline snoop cycle immediately after said basic snoop cycle, said pipeline snoop cycle having the same duration as a memory write cycle, said second snoop control means being operative, during said pipeline snoop cycle, to transmit second invalidating signals to said cache controller for invalidating a second cache line corresponding to a second planar memory location being written into during said second memory write cycle.

2. A personal computer in accordance with claim 1 wherein said control signals from said bus master means comprises, for each memory write cycle; a system address SADDR of a planar memory location to be written to, and a strobe signal SADS indicating such system address is valid, said system address SADDR and said strobe signal SADS being transmitted at the beginning of each memory write cycle;
   and said monitoring means generates said snoop control signal in response to detecting a SADS signal during said second memory write cycle.

3. A personal computer in accordance with claim 2 wherein said first snoop control means is connected to said bus master means and initiates said basic snoop cycle in response to receiving a SADS signal during said first memory write cycle.

4. A personal computer in accordance with claim 3 wherein:
said bus master means initiates a further plurality of consecutive-planar memory write cycles;
and said monitoring means and said second snoop control means are operative to detect the SADS signal in each succeeding memory cycle during a snoop cycle corresponding to the preceding memory cycle and to initiate a plurality of consecutive pipeline snoop cycles at the same rate as said further plurality of consecutive planar memory write cycles.

5. A personal computer comprising:
a memory system including a planar memory and a write-through cache system, said cache system comprising a cache for storing a plurality of cache lines and a cache controller for controlling access to said cache and selectively invalidating cache lines in response to receiving invalidating signals, said invalidating signals comprising a snoop address indicating a cache line to be invalidated and a strobe EADS which causes invalidation of such cache line;
a bus master for making a plurality of planar writes during consecutive memory write cycles which writes require invalidating different cache lines, said consecutive memory write cycles comprising a first memory write cycle and a second memory write cycle that is started immediately after said first memory write cycle;
a memory controller connected to said memory system and said bus master for accessing said planar memory and writing into said planar memory during said consecutive memory write cycles;
said bus master being operative to initiate each memory write cycle by concurrently sending to said memory controller a system address SADDR of a planar memory location to be written into, bus definition signals defining a memory write operation, and an address strobe SADS indicating said system address SADDR and said bus definition signals are valid;
said memory controller being further operative to cause invalidation of a cache line in said cache by generating and sending said invalidating signals to said cache controller, said memory controller comprising decode logic connected to said bus master, a system state machine connected to said decode logic and to said planar memory for accessing said planar memory, and a snoop state machine connected to said decode logic and to said cache controller for selectively initiating snoop cycles including a basic snoop cycle longer than a memory write cycle and a pipeline snoop cycle having the same duration as a memory write cycle;
said decode logic being connected to said bus master for receiving said system address SADDR, detecting that such address is to a location in said planar memory, and sending a first signal to said snoop state machine indicating said location is in said planar memory;
said snoop state machine comprising state means defining a plurality of states including
a first state for receiving said first signal from said decode logic and determining if a snoop cycle is required to invalidate a cache line corresponding to said planar location being written into,
a second state for generating an ENABLE signal and gating said system address SADDR, as said snoop address, to said cache control,
and a third state for generating said strobe EADS signal and transmitting such signal to said cache control;
said snoop state machine further comprising transition control means for controlling transition between said states concurrently with operation of said system state machine during said consecutive memory write cycles, said transition control means being operative to first initiate a basic snoop cycle that overlaps said first and second memory write cycles and transits said first, second and third states, and to then initiate a pipeline snoop cycle, during said second memory write cycle, which transits said second and third states.

6. A personal computer in accordance with claim 5 wherein said state means further defines a fourth state for generating an address hold request signal AHOLD preparatory to generating said ENABLE and said EADS signals, and said transition control means transits said fourth state during said basic snoop cycle.

7. A personal computer in accordance with claim 6 wherein:
said cache is a first level cache, and said memory system further includes a second level cache requiring a setup time of a predetermined duration;
and said state means further defines a fifth state providing a wait period corresponding to said setup time.

8. A personal computer in accordance with claim 7 wherein, during said basic snoop cycle, said transition control means sequentially switches through said first state, said fourth state, said fifth state, said second state, and said third state respectively.

9. A personal computer in accordance with claim 8 wherein, during said pipeline snoop cycle, said transition control means sequentially switches through said fifth state, said second state, and said third state respectively.

10. A personal computer in accordance with claim 9 comprising:
monitoring means operative during said pipeline snoop cycle to detect a new SADS in a new memory write cycle and initiate a pipeline snoop cycle in response thereto.

11. A personal computer in accordance with claim 10 wherein;
said system state machine in said memory controller accesses said planar memory, during a memory write cycle, concurrently with operation of said snoop state machine.

* * * * *